United States Patent
Kranz et al.

(10) Patent No.: US 9,061,419 B2
(45) Date of Patent: Jun. 23, 2015

(54) PROCESSING TOOL AND PROCESSING METHOD

(71) Applicant: Kuka Systems GmbH, Augsburg (DE)

(72) Inventors: Josef Kranz, Hollenbach (DE); Robert Haman, Augsburg (DE)

(73) Assignee: KUKA SYSTEMS GMBH, Augsburg (DE)

( * ) Notice: Subject to any disclaimer, the term of this patent is extended or adjusted under 35 U.S.C. 154(b) by 211 days.

(21) Appl. No.: 13/721,359

(22) Filed: Dec. 20, 2012

(65) Prior Publication Data

US 2013/0166071 A1   Jun. 27, 2013

(30) Foreign Application Priority Data

Dec. 22, 2011   (DE) .................. 20 2011 052 431 U

(51) Int. Cl.
| | |
|---|---|
| *B25J 9/16* | (2006.01) |
| *B23Q 7/00* | (2006.01) |
| *B25J 11/00* | (2006.01) |
| *B25J 15/00* | (2006.01) |
| *B23B 47/00* | (2006.01) |

(52) U.S. Cl.
CPC ............... *B25J 9/1633* (2013.01); *B23Q 7/00* (2013.01); *Y10S 901/09* (2013.01); *Y10T 29/49998* (2015.01); *B25J 11/005* (2013.01); *B25J 15/0095* (2013.01); *B23B 47/00* (2013.01)

(58) Field of Classification Search
CPC .......... B21J 15/10; B23B 35/00; B23B 39/14; B23B 49/02; B23B 51/08; B23Q 7/046; B23Q 17/09; B23Q 3/002; B23Q 3/069; B25J 15/0019; B25J 13/085
USPC ............ 901/2, 15, 20, 41; 483/11, 13, 17, 18, 483/20, 21, 25, 26, 27, 30–32, 901; 700/179, 245, 260; 29/26 R, 26 A, 563
See application file for complete search history.

(56) References Cited

U.S. PATENT DOCUMENTS

| | | | | |
|---|---|---|---|---|
| 4,611,377 | A * | 9/1986 | McCormick et al. ...... | 29/407.05 |
| 4,620,831 | A * | 11/1986 | Poncet et al. ............. | 414/744.3 |
| 4,837,983 | A * | 6/1989 | Fuller, Jr. ................ | 451/8 |
| 4,995,148 | A * | 2/1991 | Bonomi et al. ........... | 29/26 A |
| 5,088,171 | A * | 2/1992 | Suzuki .................... | 29/26 A |
| 2001/0006087 | A1 | 7/2001 | Natrop et al. | |
| 2006/0218780 | A1* | 10/2006 | Lewis et al. ............. | 29/798 |
| 2009/0279969 | A1 | 11/2009 | Mejerwall | |
| 2010/0183389 | A1* | 7/2010 | Bisiach .................... | 408/1 R |
| 2011/0318126 | A1* | 12/2011 | Cornelius et al. ........ | 408/1 R |
| 2011/0320031 | A1* | 12/2011 | Cornelius et al. ........ | 700/174 |

FOREIGN PATENT DOCUMENTS

| | | |
|---|---|---|
| DE | 41 24 078 A1 | 2/1992 |
| DE | 199 62 974 A1 | 6/2001 |
| EP | 2 017 024 A1 | 1/2009 |

(Continued)

*Primary Examiner* — Jason Holloway
(74) *Attorney, Agent, or Firm* — McGlew and Tuttle, P.C.

(57) ABSTRACT

A processing tool, especially drilling tool, includes a processing element (5) acting on a workpiece (3) and a connection (9) for a handling device (10), especially a robot. The processing tool (1) has a feed device (8) connected to the connection (9) for feeding the processing element (5) by a motion of the handling device (10) connected to the connection (9). The handling device (1) moves and actuates the feed device (8) of the processing tool (1) for feeding the processing element (5).

15 Claims, 6 Drawing Sheets

(56) References Cited

FOREIGN PATENT DOCUMENTS

| | | | |
|---|---|---|---|
| EP | 2 073 084 A1 | 6/2009 |
| JP | S60 249519 A | 10/1985 |
| JP | 2011-216050 A | 10/2011 |
| WO | 2008/027001 A1 | 3/2008 |

* cited by examiner

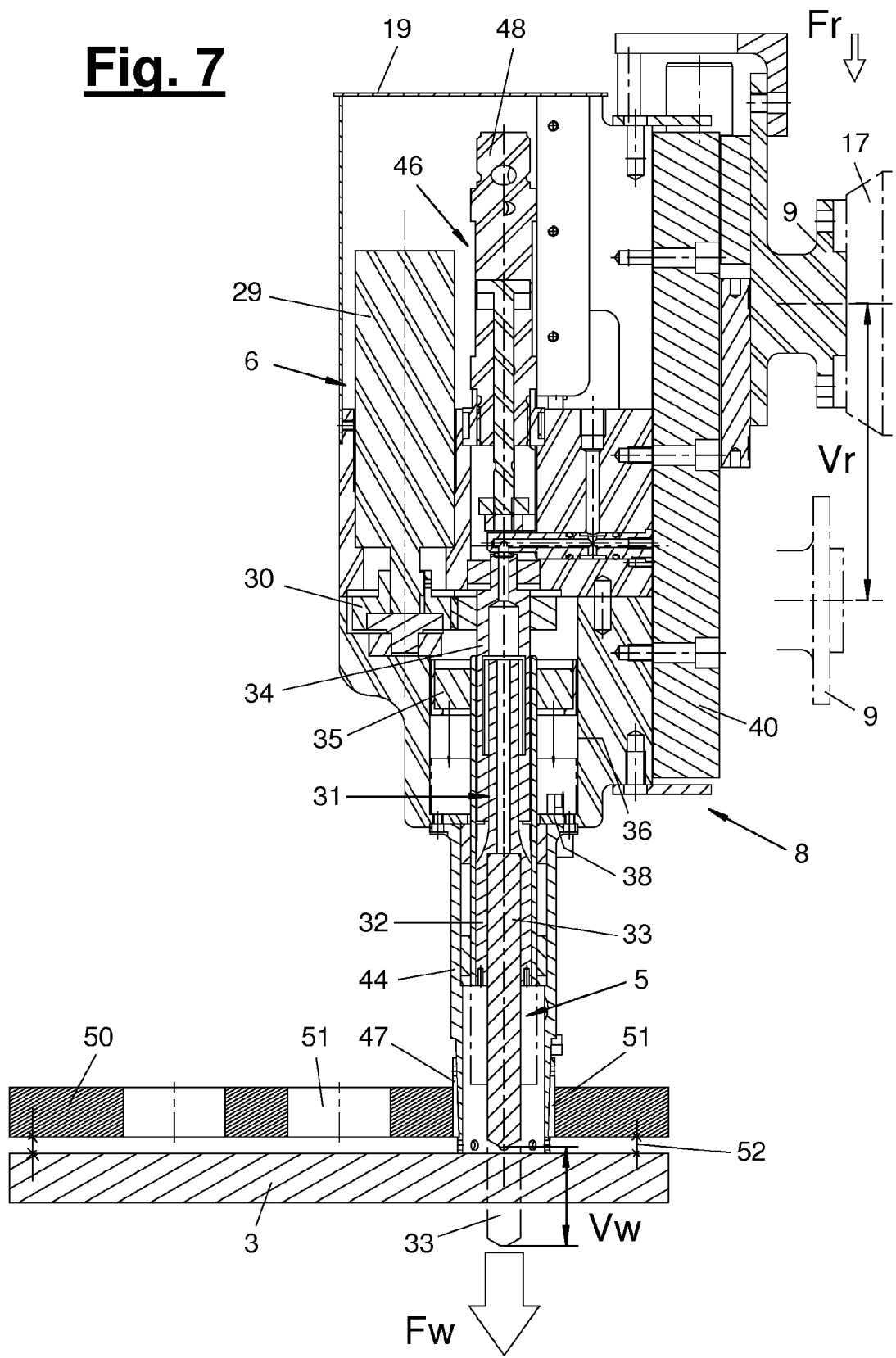

PROCESSING TOOL AND PROCESSING METHOD

CROSS REFERENCE TO RELATED APPLICATIONS

This application claims the benefit of priority under 35 U.S.C. §119 of German Utility Model Application DE 20 2011 052 431.0 filed Dec. 22, 2011, the entire contents of which are incorporated herein by reference.

FIELD OF THE INVENTION

The present invention pertains to a processing tool, especially a drilling tool, and to a processing method, especially a drilling process, with a processing element acting on a workpiece and with a connection for a handling device, especially a robot.

BACKGROUND OF THE INVENTION

A drilling tool for robot applications is known from DE 41 24 078 A1 (corresponding to U.S. Pat. No. 5,088,171). It is guided and fed by a multiaxial and programmable robot with position-controlled axes. The drilling shaft is fed and rotated with integrated, independent drives of the drilling tool.

Other drilling tools for robot applications are known from practice. In this case, the robot holds the drilling tool equipped with a rotating drive only floatingly and presses it against the workpiece, and the feed is performed directly during the drilling method by a feed motion of the robot.

SUMMARY OF THE INVENTION

An object of the present invention is to provide an improved processing technique.

According to the invention, a processing tool and processing method are provided, especially a drilling tool and method, comprising a processing element acting on a workpiece and a connection for a handling device, especially a robot. The processing tool has a feed device connected to the connection for feeding the processing element by a motion of the handling device connected to the connection. The handling device moves and actuates the feed device of the processing tool for feeding the processing element.

In the processing technique according to the invention, the feed of the processing element, e.g., of a drill, can be initiated by a handling device, preferably a multiaxial robot, via a connection at a feed device of the processing tool. This offers various advantages.

On the one hand, the processing tool being claimed can be supported independently with a support device at the workpiece or at an associated template. Feed forces can be supported hereby. A feed device can also receive a workpiece-side support. Furthermore, torques of a possible drive for a processing element, e.g., a drilling element, can be absorbed and supported on the workpiece side in case of fixation of the support device at the workpiece or at an associated template. This relieves a feed device and a connected robot.

On the other hand, the feed of the processing element can be controlled and metered sensitively. In addition, the feed can be boosted. The processing tool being claimed may have a boosting means for the feed, especially for the feed force, of a processing element. A combination of the boosting means with a support device is especially advantageous.

The feed may be initiated, e.g., by a robot having a lightweight construction via a connection of a feed device. The boosting means is especially advantageous for the use of robots having a lightweight construction with low weight and low load or effective force and makes possible the use thereof for processing tasks, especially drilling processes, which require a feeding and pressing force that is greater than the load or effective force of the robot, especially a lightweight robot. The torque resistance by a support device is also especially advantageous for a lightweight robot.

A dynamic processing tool, especially a drilling tool, which has a substantially expanded field of use compared to prior-art constructions and is suitable for various types of handing means and robots, can be created with the boosting means and possibly the support device.

The boosting means may have a fluidic, especially hydraulic transmission or a mechanical transmission, e.g., a toothed gearing. A great feed path with low feed force of the handling device is converted by the transmission into a smaller feed path with boosted feed force.

The processing tool may have a drive for proper motion, especially a rotary drive, of the processing element, which is especially favorable for the feed in cooperation with a boosting means. A drive transmission can superimpose the feed motions and the proper motion, especially rotary motion, of the processing element to one another.

The feed device may be equipped with a fixing means, which blocks the feed during the feed motion of the processing tool to a workpiece or to an associated template and can subsequently be released for performing the processing method and the feed.

The processing tool may have, furthermore, a clamping means, which makes temporary fixation possible at the workpiece or an associated template. This is advantageous for the support function and positioning. The arrangement and positioning of a template with passage openings at the intended processing points on the workpiece is especially favorable for the process quality.

The preferably multiaxial and programmable handling device may be advantageously designed as a robot with a robot control. It is especially advantageous in this connection if the robot has one or more force-controlled or force-regulated robot axes with an associated sensor system, which can detect especially loads acting on the robot axes from the tool. This sensor system may be used to monitor and control and possibly regulate the processing method. In addition, drilling through a workpiece by means of detecting the at first rising and then again declining drilling resistance can be detected as well. Malfunctions of the processing tool, e.g., rupture or other failure of the processing element, can also be detected from the associated change in load, especially the change in torque. A separate sensor system necessary for the state of the art for controlling and monitoring the processing method is dispensable owing to the sensor system integrated in the robot.

In addition, the robot can have one or more flexible robot axes with active compliance regulation or with a combination of position and force regulation by means of said sensor system. On the one hand, overload on the workpiece can be avoided hereby. In particular, the feed can be optimally adapted to the particular process conditions. In addition, such an active compliance regulation is advantageous for avoiding accidents or damage to the processing tool. In addition, it facilitates and simplifies the teaching of the robot with the processing tool.

The processing tool being claimed and the processing method being claimed as well as the possibly associated handling device are suitable and designed for various types of processing methods. This may be, e.g., a drilling process. As an alternative, another processing method is possible in case of a corresponding tool design. In addition, proper motion of the processing element and a corresponding drive may be eliminated for a processing method, and only the feed and possibly a boosting there is used. Such a process may be, e.g., pressing or pressing on of workpiece parts with a processing element designed as a pressure piston. As an alternative, kinematic reversal and a pulling process is possible as well.

In one embodiment, the drive of the processing element is connected to the support device of the processing tool and is connected to the fed processing element by a drive transmission, e.g., a spline shaft or polygon shaft.

Provisions are made in one exemplary embodiment for the boosting means to be associated with the feed device and to be preferably integrated in same. It is advantageous, furthermore, if the boosting means has a transmission, which preferably has a driving actuating element connected to the connection and a driven actuating element connected to the processing element. A fluidic, especially hydraulic transmission may have, e.g., a driving cylinder and a fluidically coupled driven cylinder, wherein the cylinders have corresponding volumes with pistons of different sizes and the actuating elements are designed as piston rods. A fluidic, especially hydraulic transmission may advantageously contain a venting means with an overpressure unit.

In one embodiment, the boosting means has a resetting means. In one embodiment, the feed device has a stop for feed limitation, which is preferably associated with the driven feed element, especially a feed bridge. It is advantageous if the feed elements are movably linearly and in the same direction and are mounted at feed guides, especially a bridge guide and a carriage guide. In one exemplary embodiment, the feed device has a controllable fixing means. Provisions are made in one embodiment variant for a clamping means to be arranged at the support device. Such a clamping means may advantageously have a movable clamping means, especially a clamping sleeve, at the workpiece-side end of the support device as well as a controllable actuating means for the clamping means.

Provisions are made in a preferred embodiment of a processing device for a multimember, multiaxial and programmable robot, especially a lightweight robot. In case of a design as an articulated arm robot, the robot axes (I-VII) thereof may have a bearing each, especially a pivot bearing, and a controllable or regulatable axis drive, especially a rotary drive, which is associated here with a sensor system. The robot axes (I-VII) may have, furthermore, a controllable or switchable brake.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 7 is a central longitudinal sectional view through the processing tool and a workpiece with template according to FIG. 1.

DESCRIPTION OF THE PREFERRED EMBODIMENTS

Figure 1:
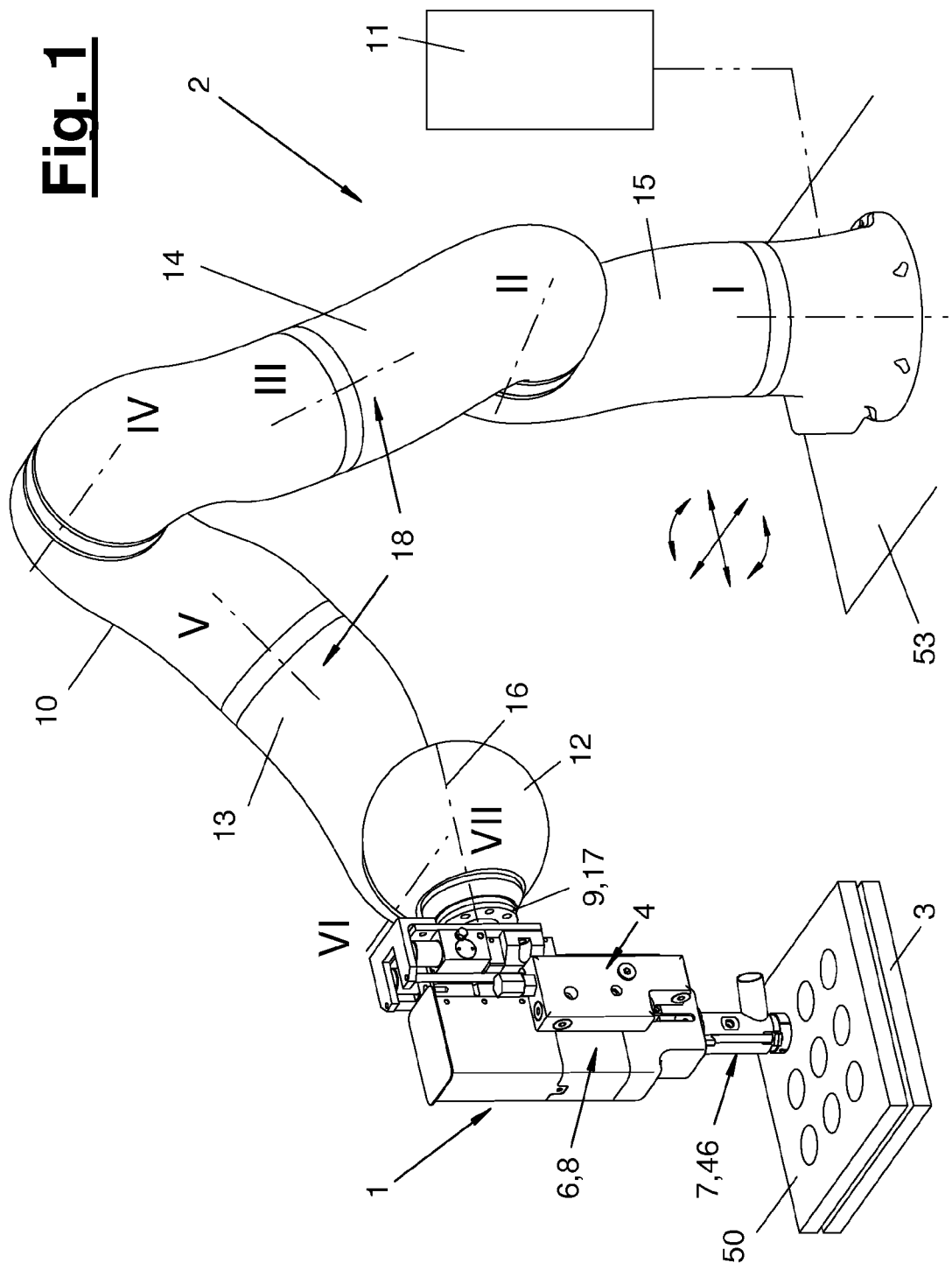
FIG. 1 is a schematic perspective view of a processing tool with a lightweight robot.

Referring to the drawings in particular, the present invention pertains to a processing tool (1), a processing method and a processing device (2) equipped with such a processing tool (1) and with a handling device (10).

FIG. 1 shows a processing tool (1) with a workpiece (3) on which it acts along with a template (50) associated with workpiece (3). The processing tool (1) has a feed device (8) connected to connection (9) for feeding a processing element (5) for processing the workpiece (3). The feed device (8) is a force transmission, transmitting a feed force from the connection (9) to the processing element (5). The feed force for the feed is generated by a motion of the handling device (10), connected to the connection (9), relative to the feed device (8). The processing tool (1) has, furthermore, a boosting means or force amplifier (4) for the amplification of the feed, especially for the feed force, of the processing element (5). The force amplifier (4) may be associated with the feed device (8) and especially integrated in same.

The processing tool (1) may have, furthermore, a support device (7) as well as optionally a clamping means (46) for workpiece-side support and fixation. In addition, the processing tool (1) may have a drive (6) for proper motion of the fed processing element (5), e.g., for a rotary motion. The aforementioned components of the processing tool (1) are shown specifically in the drawings of FIGS. 2 through 7 and will be described below.

The processing tool (1) and feed processing element (5) may have different designs for different processing methods. In the exemplary embodiment being shown, the processing tool (1) is designed as a drilling tool and processing element (5) as a drilling element. The above-mentioned proper motion of drilling element (5) is a rotary motion. Other suitable tool and process designs pertain to other types of processing techniques, e.g., grinding, milling, cutting, friction or the like. Shaping techniques, joining techniques or the like can be carried out as well. In principle, any processing technique that contains a feed of a processing element with a necessary feed force is mentioned.

The handling device (10) is preferably multiaxial and programmable. It may have any desired number and combination of rotatory and/or translatory robot axes and may be connected to a control (11) schematically shown in FIG. 1, especially a robot control, for controlling and possibly regulating the robot axes. The robot control (11) may have a computing unit, one or more memories for data or programs as well as input and output units. It can store process-relevant data, e.g., sensor data, and log them for quality control and quality assurance.

The processing tool (1) with one or more components, e.g., a drive (6), a clamping means (46), a fixing means (42), a restoring means (39) or the like may also be connected to control (11) and implemented, e.g., as additional robot axis (axes). The handling device (10) may be arranged stationarily or nonstationarily by means of a conveying means (53) on a base. The arrows in FIG. 1 illustrate as an example the possibilities of translatory and/or rotatory motion given hereby.

The handling device (10) may form one working device (3) with the connected the processing tool (1). The handling device (10) is designed as a multiaxial and programmable robot in the embodiment shown in FIG. 1. The following description of the robot applies, with corresponding adaptation, to other types of the handling device (10) as well.

FIG. 1 shows a special embodiment as a lightweight robot. The robot may have, furthermore, one or more force-controlled or force-regulated robot axes, e.g., seven axes (I-VII) here. Furthermore, one or more flexible robot axes with active compliance regulation may be present. The axes (I-VII) each have a pivot bearing and a controllable or regulatable drive associated here along with a sensor system (18). The robot axes (I-VII) may have, besides, a controllable or switchable brake. Further details will be explained for this below.

The robot (10) possibly develops only a relatively weak infeed or feed force acting on the connection (9), which force is not sufficient for the feed of the processing element (5) or brings about an undesirably high load on the axis. The boosting means (4) offers a remedy here by converting, according to FIG. 7, a feed motion of robot (10) with a weak force Fr and a long path Vr into a feed motion of processing element (5) with a stronger feed force Fw and a shorter feed path Vw. The feed motions are preferably linear and directed in parallel.

FIGS. 2 through 7 show details of the processing tool (1) and components thereof in external views and in partly cut-away or cut-away views.

Figure 5:
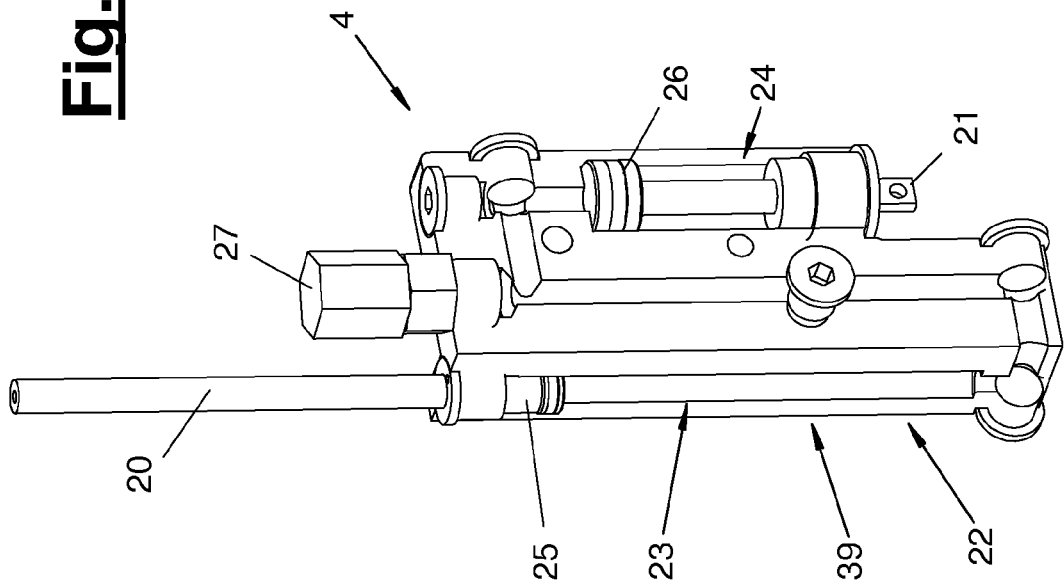
FIG. 5 is a schematic cut-away perspective view a boosting means of the processing tool from FIGS. 1 through 3.
Figure 4:
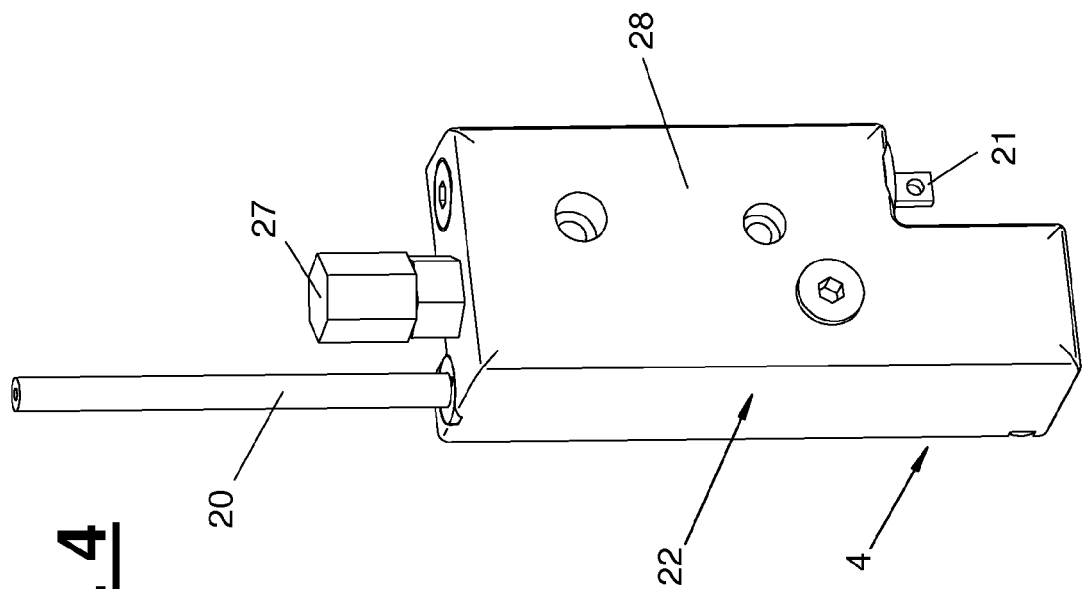
FIG. 4 is a schematic closed perspective view a boosting means of the processing tool from FIGS. 1 through 3.
Figure 6:
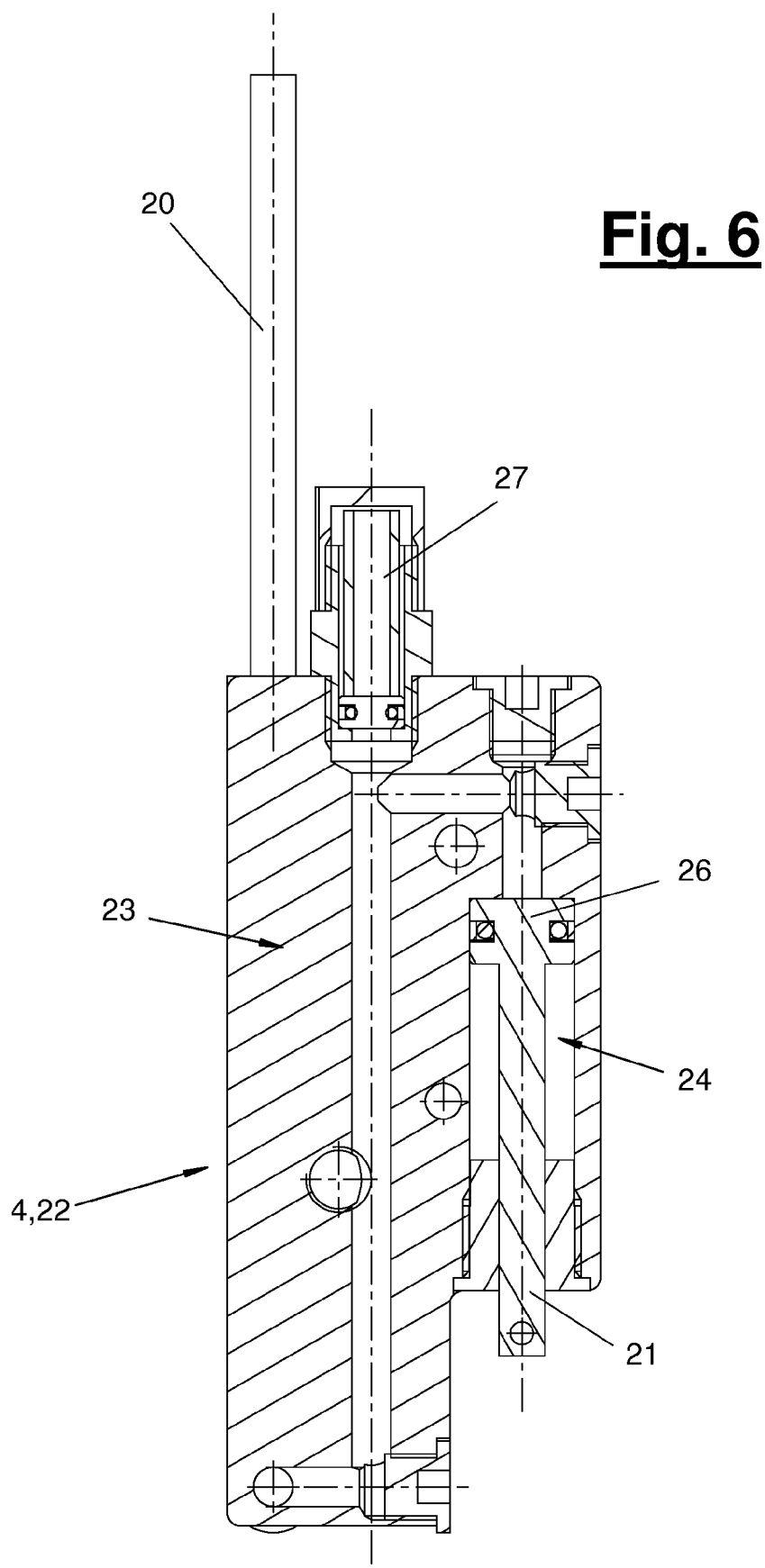
FIG. 6 is a longitudinal sectional view through the boosting means from FIGS. 4 and 5.

The boosting means (4) is arranged between flange-like connection (9) and processing element (5). It may be associated with feed device (8) and especially integrated in same. FIGS. 4 through 6 illustrate the details of the boosting means (4). Only parts of the boosting means (4) can be seen in the other figures.

According to FIG. 4, the boosting means (4) has a housing (28), from which a driving actuating element (20) and a driven actuating element (21) protrude, which are connected to a feed element (40) driving on the robot side and with a feed element (35) driven on the workpiece side, and are connected, furthermore, to processing element (5). The boosting means (4) has a transmission (22) between the rod-like actuating elements (20, 21).

As is illustrated in FIGS. 5 and 6, this is a fluidic, especially hydraulic transmission (22) in the exemplary embodiment being shown, which has a driving cylinder (23) and a driven cylinder (24), which are connected to one another by lines, which make it possible for the fluid to flow over from the driving cylinder (23) to the driven cylinder (24). The actuating elements (20, 21) are designed as piston rods. A venting means (27) with an overpressure unit may be arranged on the fluid lines. The boosting means (4) may also have a resetting means (39), indicated only schematically by an arrow and not shown in more detail, e.g., a spring or a controllable resetting element, for return after feed.

The driving piston (25) has an effective area size that is smaller, corresponding to the desired transmission ratio, than the effective area of the driven piston (26). The length of driving cylinder (23) is correspondingly greater than that of driven cylinder (24). The volumes of the cylinders (23, 24) may be essentially equal. The above-described force and path ratios Vr/Vw and Fr/Fw are obtained and set by transmission (22). As an alternative to the exemplary embodiment shown, the transmission (22) may have a different design, e.g., in the form of a toothed gearing.

The feed device (8) has a mobile feed element (40), which is connected to the connection (9) and which acts on the upwardly projecting actuating element (20) via a carrier or the like. A preferably linear feed mount (41), which is connected to a housing or frame (19) of the processing tool (1) and in which the support device (7) described below is in turn connected, is provided for feed element (40). The feed element (40) is designed, e.g., as a carriage and the feed mount is designed as a carriage guide. A suitable sensor system (43) for path measurement, an end switch or the like may be associated with feed element (40). Furthermore, a controllable fixing means (42), e.g., in the form of a clamping means, may be present for the feed element (40), said fixing means blocking, when actuated, the feed device (8) and the mobility thereof, so that a rigid connection is established between the connection (9) and the processing element (5) for the purpose of feeding the processing tool (1) or the like.

The feed device (8) has, furthermore, a feed element (35), which is connected to the processing element (5) and which is guided and mounted in housing (19) by means of a feed guide (36). The feed element (35) is designed, e.g., as a piston-like feed bridge, which is held and guided linearly movably in the feed guide (36), e.g., a cylinder-like bridge guide. The feed guide (36) may have a stop (38) for feed limitation. The venting means (27) can prevent overload on the fluidic transmission (22) in case of contact with the stop.

Figure 2:
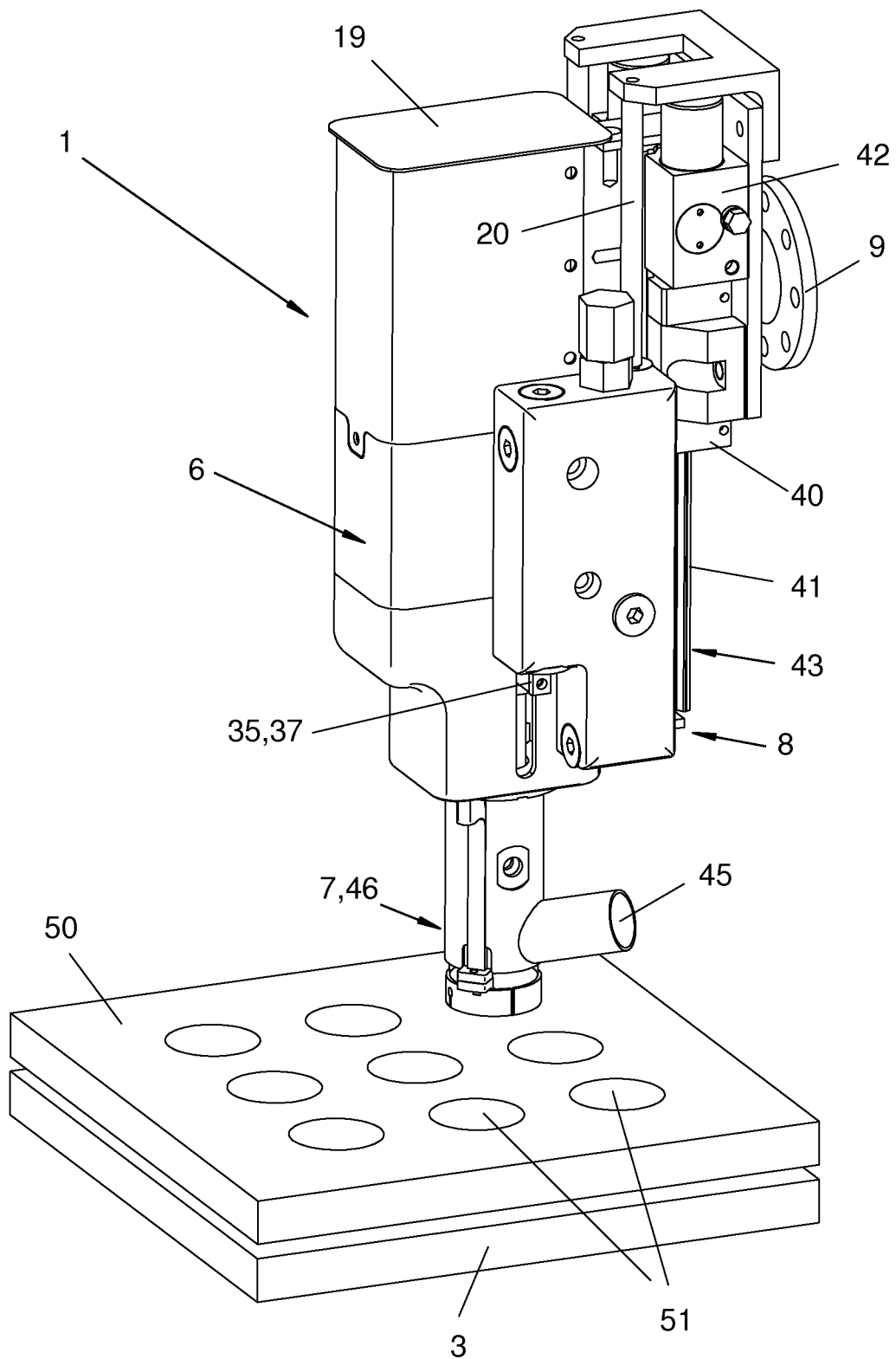
FIG. 2 is a schematic enlarged view of the processing tool from FIG. 1.
Figure 3:
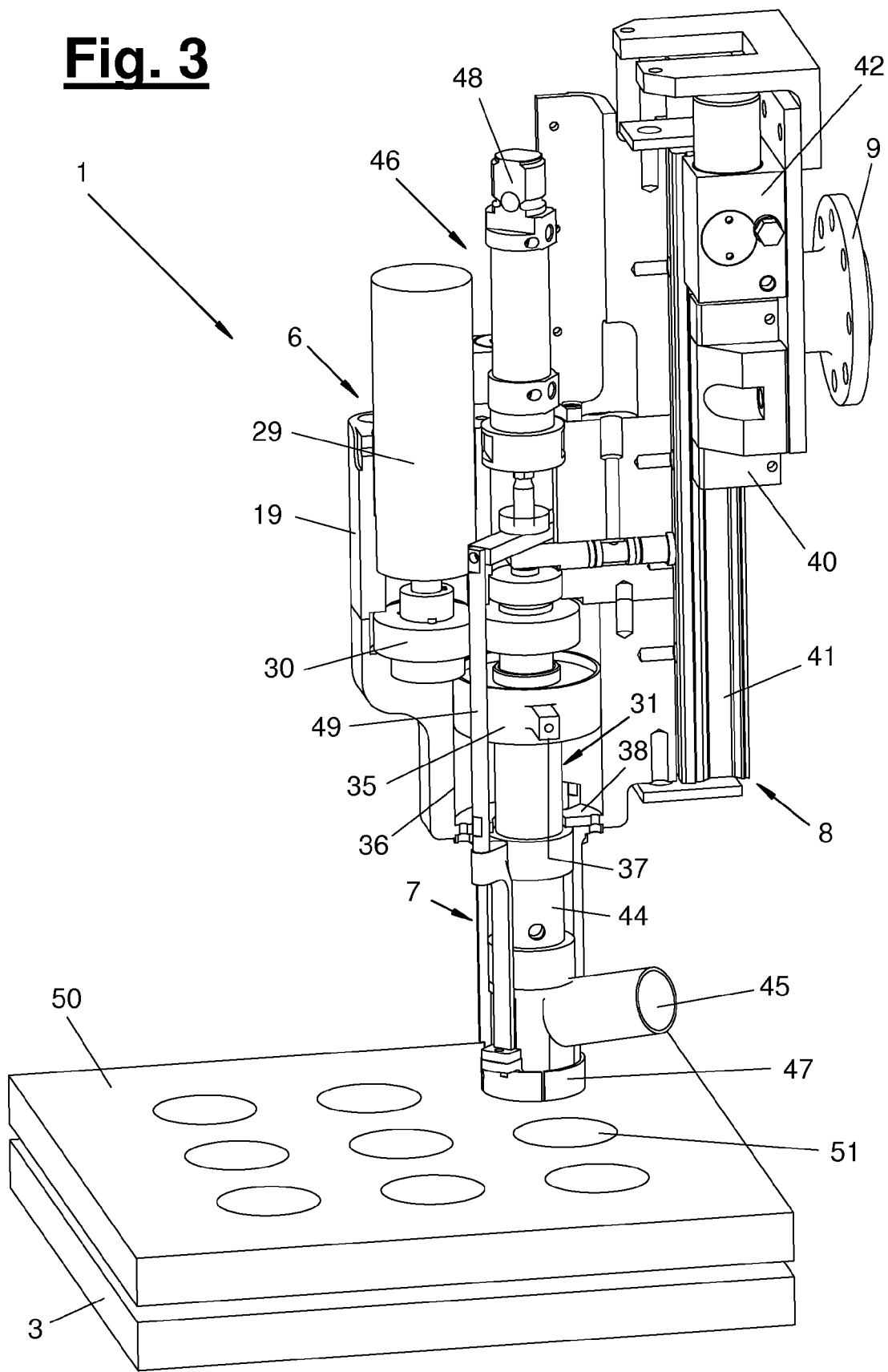
FIG. 3 is a schematic perspective view of the partly cut-away processing tool from FIGS. 1 and 2.

The driven feed element (35) is connected on the inlet side to the driven actuating element (21) of the boosting means (4) and has, e.g., a carrier (37) for this, which projects outwardly through a slot in the wall of housing (19) and is connected to the actuating element (21). FIGS. 2 and 3 show this arrangement. The feed element (35) is connected to processing element (5) on the outlet side or power take-off side.

The processing element (5) comprises, e.g., according to FIG. 7, a drill bit (33), which is held in a coaxially rotating drilling spindle (32) in a rotationally engaged manner. The drill spindle (32) is in turn connected to the driven feed element (35) via an outside sleeve, which transmits the feed motion to the drill spindle (32) and the drill bit (33).

The processing tool (1) has the above-mentioned drive (6) present as a single drive or as multiple drives, for a superimposed tool motion. As is illustrated in FIGS. 3 and 7, the drive (6) is designed as a rotary drive and has a motor (29), e.g., a pneumatic drive motor and a transmission (30), which is connected to a mount (34) for the actuating element. A drive transmission (31), which make possible a superimposition of the rotary drive motion and the linear feed motion of the processing element (5), may be inserted here. It may be designed for this, e.g., as a spline shaft or as a polygon shaft.

In the present case of a drill spindle (32), a mount (34) is designed as a spindle mount, which extends over drill spindle (32) in a sleeve-like manner and is connected to same via drive transmission (31) in a rotationally engaged manner and also axially movable manner. The drill bit (3), the drill spindle (32), the mount (34) and the feed element (35) are arranged coaxially and extend in the vertical feed direction. The motor (29) is arranged in parallel thereto.

The feed elements (35, 40) are mounted movably relative to support device (7). The boosting means (4) is connected to housing (19) possibly on the outside with its own housing and is likewise connected hereby to support device (7). The boosting means (4) can be supported hereby at workpiece (3) or at the associated template (50) in the working position.

The support device (7) has a support (44). This is designed, e.g., as a support pipe and concentrically surrounds the processing element (5) and possibly the drive transmission (31). In the embodiment of a drill spindle (32) shown, the latter can be guided axially at the inside of the support pipe (44). In addition, a pipe branch of an exhaust device (45) for removing the drill chips may be arranged at the support pipe (44).

The support device (7) may cooperate with a clamping means (46), which makes it possible to fix support device (7), especially the support device (44), in the working position at workpiece (3) or at a template (50). The clamping means (46), which is, e.g., of the type of a spring collet, has a clamping member (47) for this at the workpiece-side end of the support device (44), which is designed, e.g., as a clamping sleeve and may have a conical shape. The clamping member(47) can be activated and deactivated by means of a controllable actuating means (48). The actuating means (48) is designed, e.g., as a lifting unit and is arranged in the housing (19). It is in driving connection with the clamping means (47) by means of a transmission means (49), e.g., a linkage. The lifting unit (48) can pull the clamping sleeve (47) axially upward at the support pipe (44) and widen same thereby, while the clamping sleeve (47) is clamped in a passage opening (51) of the template (50) and thereby also fixes the support device (44). The clamping technique may otherwise be performed in another suitable manner.

The template (50) can be fixed via a fastening means (52) at the workpiece (3) or at another suitable point. The template (50) may have one or more passage openings (51), whose position corresponds to the one or more processing points on the workpiece (3). The one or more openings (51) cooperate with the processing tool (1), especially with the support device (7) thereof and possibly with the clamping means (46) thereof.

The robot (6) may be arranged, in the manner described in the introduction, on a conveying means (53), which is movable multiaxially on a base. This may be a vehicle, an air cushion or gliding cushion unit, carriage arrangement or the like. The drive for the conveying motion may be generated by robot (10) itself, and it may use its processing tool (1) and template (50) for plotting and supporting. As a result, a possibly elongated workpiece (3) can move along and also reach processing points that are located outside its normal working range. For its progression, the robot (10) inserts the processing tool (1) in a stretched position into a passage opening (51) and fixes itself there via the support and the clamping means (7, 46). The robot (10) then pulls itself to this fixing and anchoring site, and it can detect and track its position on the basis of the detected axis positions. The robot (10) can subsequently assume its working position again for the next process or possibly a new stretched position and anchor and fix itself at the next opening in the manner described. Thanks to the above-described fixation, no separate fixation of the position of the conveying means (53) is necessary in the process. However, a corresponding fixing means, e.g., a plotting means, a brake or the like may be present.

FIG. 1 shows the above-mentioned preferred embodiment of a robot (10), which is designed as a lightweight robot in this case. It consists of lightweight materials, e.g., light metals and plastics, and also has a small overall size. It has a low weight and a correspondingly limited carrying force, which may reach, e.g., up to 20 kg. Such a lightweight robot with a weight of, e.g., less than 50 kg and especially approx. 30 kg for the robot (10) and tool (1) can be mobile and can be transported by hand from one site of use to another.

The robot (10) shown has a plurality of movable and mutually connected members (12, 13, 14, 15). These are preferably connected to one another in an articulated manner and via said rotating robot axes (I-VII). Furthermore, the individual members (13, 14) may be designed as multipart members movable in themselves. The robot axes (I-VII) and their axis drives, especially rotary drives, as well as the sensor system (18) are connected to the robot control (11), which can control and regulate the drives and the axis drives. The power take-off side end member (12) of the robot (10) is designed, e.g., as a robot hand and has a power take-off element (17) rotatable about an axis of rotation (16), e.g., a power take-off flange. The axis of rotation (16) forms the last robot axis VII. The tool (1) is mounted on power take-off element (17). One or more lines for operating materials, e.g., power currents and signal currents, fluids, etc., can be led through a possibly hollow power take-off element (17) and possibly other robot members (13, 14, 15) and exit to the outside at the flange (17) and connected at the tool (1).

The above-mentioned force control or force regulation of the robot axes (I-VII) pertains to the action to the outside at power take-off element (17) of the end member (12) as well as to the forces of reaction acting there. A torque control or torque regulation takes place internally within the robot at the rotating axes or axis drives.

The robot (10) preferably has three or more movable members (12, 13, 14, 15). In the exemplary embodiment being shown, it has a basic member (15) connected to a base or the conveying means (53) as well as two intermediate members (13, 14), which have a multipart design and are rotatable in themselves by means of axes III and V. As an alternative, the number of intermediate members (13, 14) may be lower or higher. In another variant, some of the intermediate members (13, 14) or all intermediate members (13, 14) may be designed as nonrotating members and without additional axis.

The sensor system (18) may have, e.g., one or more sensors at one or more axes (I-VII). These sensors may have the same function or different functions. They may be designed, in particular, as force or torque sensors and designed to detect loads, especially torques, which act on the robot via the power take-off element (17) from the outside. The sensors can, furthermore, detect rotary motions and possibly rotation positions.

The above-mentioned active compliance regulation can be achieved by the control (11) by means of the sensor system (18). As a result, the robot (10) can hold and guide, on the one hand, the tool (1) in a spring-loaded manner such that it is able to perform evading motions during infeed and, e.g., crashes and especially accidents with persons can be avoided. The property can also be used for a manual teaching and programming, with the advantage of rapid and simple programming, putting into operation as well as adaptability to different tools (1) and hence to processes and jobs to be performed therewith. In addition, the search for and finding of working positions and also of plotting points at the openings (51) can be supported and facilitated by means of a load detection by sensor system (8). Angle errors in the relative positions of the members (12, 13, 14, 15) can also be detected and corrected if needed.

The sensor system (18) may be used, furthermore, to check the geometric accuracy and ability to function of the tool (1). The robot (10) can bring, e.g., the tool (1) into a slight contact with the elements to be checked, especially support device (44), at a reference point with known position, while the motion and position of the robot are monitored and a contact is detected by means of sensor system (18). Collisions that could lead to damage are avoided by the active compliance regulation, and the motion of the robot is stopped or switched off when a preset load threshold is exceeded. By comparing the desired position and actual position of the robot at the time of contact detected by means of the sensor system (18), it can be determined whether a tool (1) is intact or damaged and whether, in particular, the programmed tool center point (TCP) of tool (1) is still at the intended position.

Furthermore, the processing tool (1) and its components can be checked for correct function during feed by monitoring the occurring loads. The action of the processing element (5) and of the processing method can also be monitored by load detection.

Various variants of the embodiments shown and described are possible. The features of the exemplary embodiments can be mutually replaced with one another and combined.

The robot (6) may be arranged in the manner described in the introduction on a conveying means (53), which is multi-axially movable on a base. It may be a vehicle, an air cushion unit or the like. The drive for the travel motion can be produced by the robot (6) itself, and it can use its processing tool (1) and the template (50). As a result, it can move along a possibly elongated workpiece (3) and also reach processing points that are located outside its normal working range. For immediate motion, the robot (6) inserts the processing tool (1) into a passage opening (51) and fixes itself there by means of the support and the clamping means (7, 46). The robot (6) then pulls itself by a motion of its robot axis to this fixation and anchoring site, and it can detect and track its position on the basis of the axis positions detected. The robot (6) can subsequently again assume a stretched position and anchor and fix itself at the next opening (51) in the manner described. Thanks to the above-described fixation, no separate position fixation of conveying means (53) is necessary in the process for processing the workpiece. However, a fixing means, e.g., a plotting means, a brake or the like may be present.

While specific embodiments of the invention have been shown and described in detail to illustrate the application of the principles of the invention, it will be understood that the invention may be embodied otherwise without departing from such principles.

What is claimed is:

1. A processing tool comprising:
    a processing element for acting on a workpiece;
    a connection for a handling device;
    a feed device connected to the connection, the feed device comprising a force transmission with a movable feed element connected to the connection and with an additional moveable feed element connected to the processing element, the force transmission transmitting a feeding force to the processing element with an applied force applied with a motion of the handling device, connected to the connection, relative to the feed device, to feed the processing element relative to the feed device with the feeding force;
    a force amplifier connected with said feed device, the force amplifier being between the connection and the processing element and amplifying the feeding force relative to the applied force;
    a support device forming a support on a workpiece side and supporting the feed device against the applied force, wherein the movable feed element and the additional moveable feed element are mounted movably in relation to the support device and are connected to the force amplifier.

2. A processing tool in accordance with claim 1, further comprising a controllable rotary drive for a controlled motion of the processing element.

3. A processing tool in accordance with claim 1, wherein the force amplifier comprises a fluidic or a mechanical transmission.

4. A processing tool in accordance with claim 1, wherein the feed device has a controllable fixing device.

5. A processing tool in accordance with claim 2, wherein the processing element comprises a drill spindle with a drill bit, wherein the drill spindle is connected to a feed element of the feed device and is connected to a rotating spindle mount via a drive transmission in a rotationally engaged manner, wherein the spindle mount is in turn connected to the controllable drive.

6. A processing tool in accordance with claim 1, wherein the support device has a support and a clamping device fastening the support at a workpiece or at a template that can be connected to workpiece.

7. A processing tool in accordance with claim 6, wherein the support comprises a support pipe that guidingly surrounds the processing element on a circumferential side, wherein the support pipe is connected to an exhaust device.

8. A processing device comprising:
    a processing tool comprising a processing element for acting on a workpiece, a connection for a handling device, a feed device connected to the connection, the feed device comprising a force transmission with a movable feed element connected to the connection and with an additional moveable feed element connected to the processing element, the force transmission transmitting a feeding force to the processing element with an applied force applied with a motion of the handling device, connected to the connection, relative to the feed device, to feed the processing element relative to the feed device with the feeding force, a force amplifier connected with said feed device, the force amplifier being between the connection and the processing element and amplifying the feeding force relative to the applied force and a support device forming a support on a workpiece side and supporting the feed device against the applied force, wherein the movable feed element and the additional feed element are mounted movably in relation to the support device and are connected to the force amplifier; and
    a handling device for handling the processing tool, the handling device being connected to the connection.

9. A processing device in accordance with claim 8, further comprising:
    a template which can be connected to a workpiece in a defined position, the template having at least one passage opening, a position of the passage opening corresponding to an intended processing site on the workpiece.

10. A processing device in accordance with claim 8, wherein the handling device comprises a multiaxial programmable robot, the robot having one or more force-controlled or force-regulated robot axes with an associated, integrated sensor system, which detects loads acting on the robot.

11. A processing device in accordance with claim 10, wherein the robot has at least one flexible robot axis and at least one of an active compliance regulation in the form of a pure force regulation and a combination of position and force regulation.

12. A processing device in accordance with claim 10, wherein the robot is arranged nonstationarily and on a conveying devicehim.

13. A method for processing workpieces with a the processing tool, the method comprising the steps of:
    providing a processing element acting on a workpiece, a connection for a handling device, a feed device connected to the connection, the feed device comprising a force transmission with a movable feed element connected to the connection and with an additional moveable feed element connected to the processing element, the force transmission transmitting a feeding force to the processing element with an applied force applied with a motion of the handling device, connected to the connection, relative to the feed device, to feed the processing element relative to the feed device with the feeding force, a force amplifier connected with said feed device, the force amplifier being between the connection and the processing element and amplifying the feeding force relative to the applied force and a support device forming a support on a workpiece side and supporting the feed device against the applied force, wherein the movable feed element and the additional feed element are mounted movably in relation to the support device and are connected to the force amplifier; and guiding the processing tool by the handling device, wherein the handling device moves and actuates the feed device of the processing tool, which said feed device is connected to the connection, for feeding the processing element.

14. A method in accordance with claim 13, wherein the processing tool is supported at the workpiece by means of a support device during the processing of the workpiece.

15. A method in accordance with claim 13, wherein the processing element is moved independently with a drive during the processing of the workpiece.

\* \* \* \* \*